Patented Sept. 18, 1951

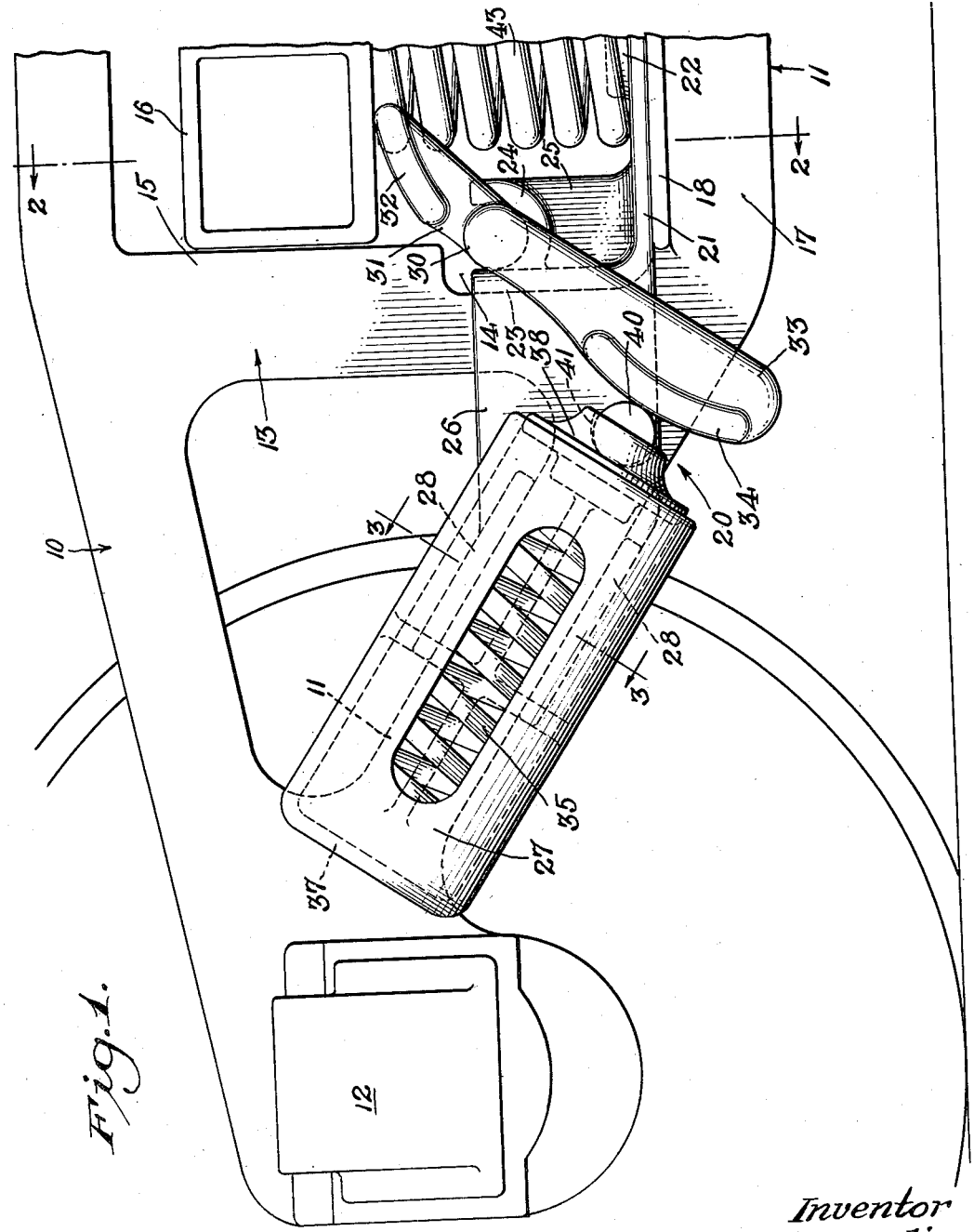

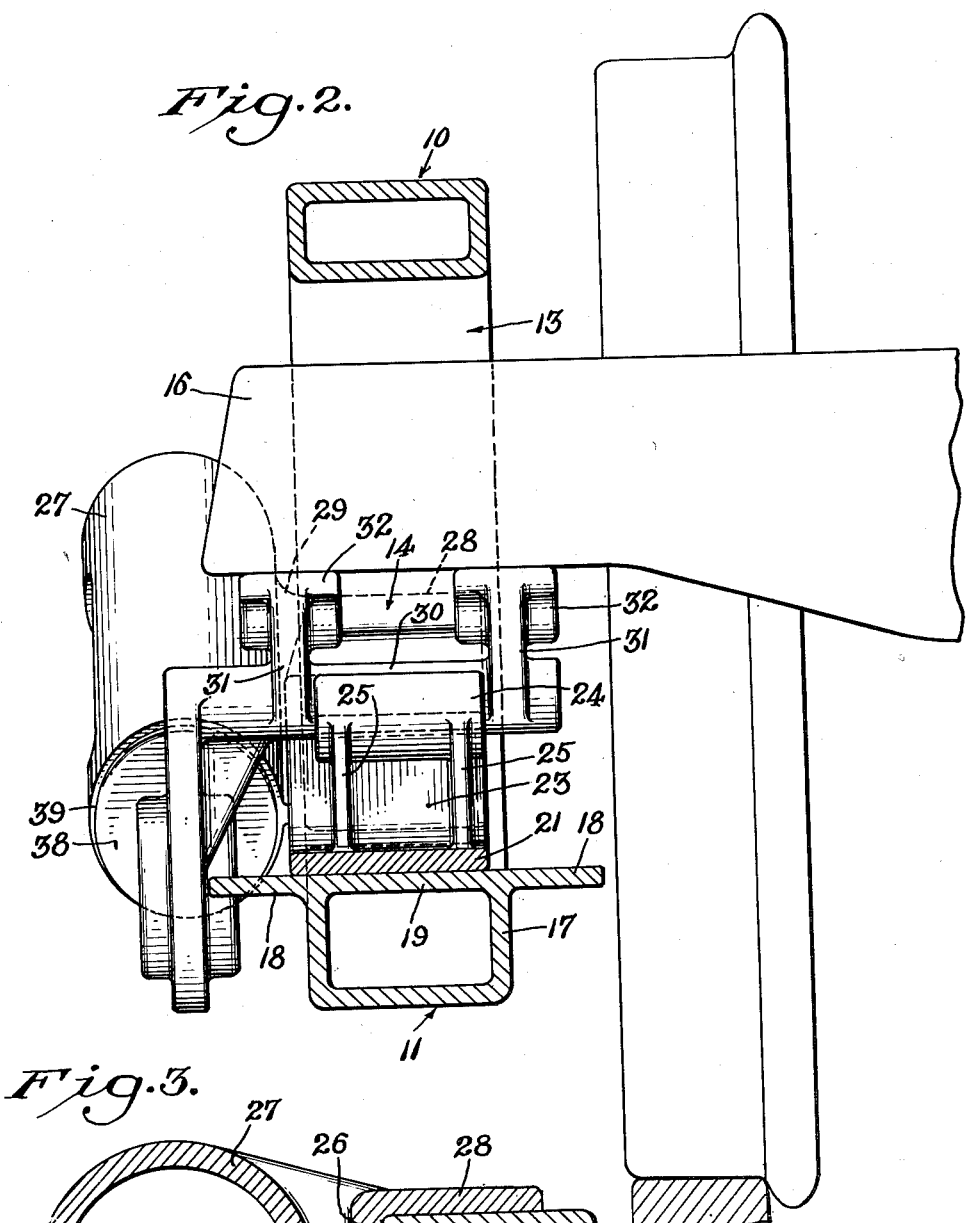

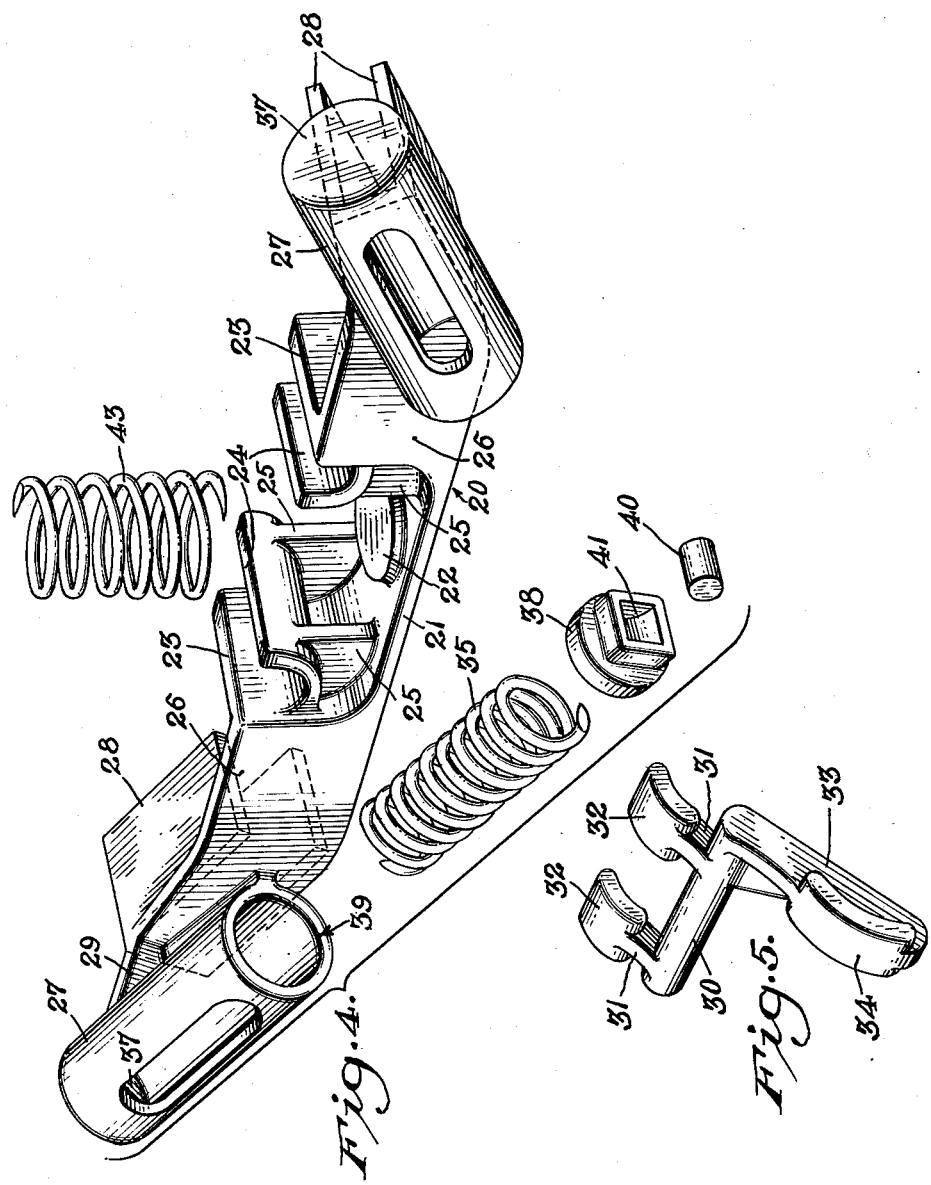

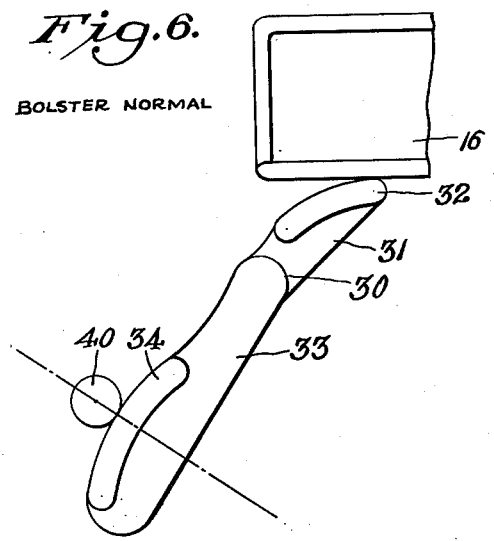
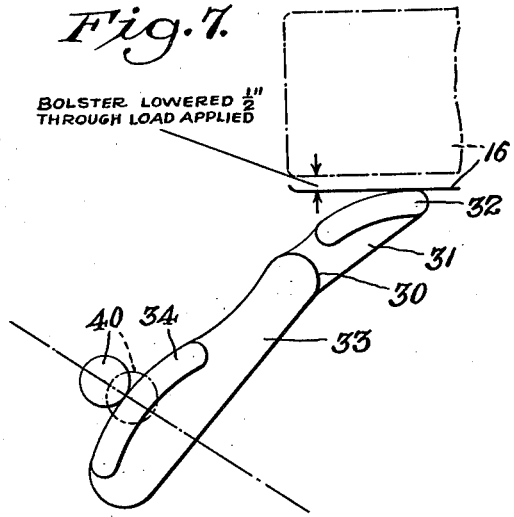
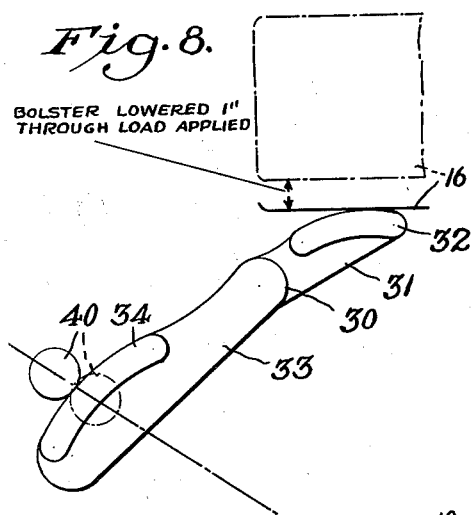
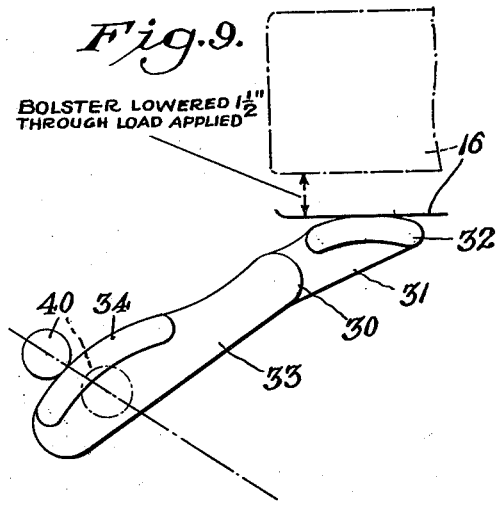
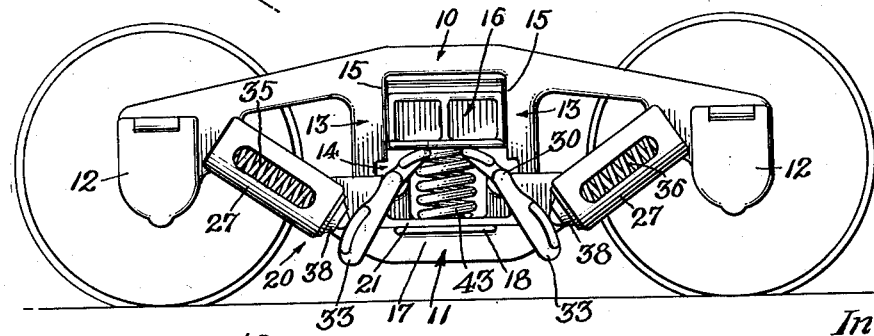

2,568,201

UNITED STATES PATENT OFFICE 2,568,201

SPRING BOLSTER TRUCK

Carl R. Moline, Homewood, Ill., assignor to American Steel Foundries, Chicago, Ill., a corporation of New Jersey Application May 25, 1945, Serial No. 595,687

16 Claims. (Cl. 105—197)

1

Standard car springs are designed to carry safely the maximum load for the car. Standard couplers limit the vertical movement at the bolsters to a maximum of about 1½". Springs that will carry safely the maximum load with no more than 1½" deflection are so stiff for most, if not all, cars that they are not springs for all practical purposes when the cars are empty or lightly loaded. All this is entirely aside from the perplexing difficulties with harmonics and such like that have posed such a problem.

Long-travel, soft springs necessary to comfortable cushioned riding under empty or light load conditions with sufficient deflection to carry safely full loads with a reserve for safety cannot be gotten within the space allowed at the nest location of standard specifications. (Car Builders' Cyclopedia, 1943, section 14, page 1079.)

The principal object of this invention is to overcome these and other related difficulties familiar to the trade with respect to conventional practice and to provide vastly improved riding qualities for existing and new cars.

Generally speaking, this is accomplished by supporting the bolsters on long-travel, soft springs through levers that transform or convert the small vertical movement allowable at the bolsters into generous movement at the springs placed outside of the conventional nest location in the truck side frame beneath the bolsters.

The embodiment shown in the drawing is particularly suited for attachment to one of more than twenty types of trucks, for that is thought to be the form that is currently most acceptable.

Fig. 1 is a side elevation of the left half of a truck of conventional form with the invention applied to it;

Fig. 2 is a vertical section taken on the line 2—2 of Fig. 1;

Fig. 3 is a transverse section taken on the diagonal line 3—3 of Fig. 1;

Fig. 4 is a perspective view of the base frame and associated parts in an attachment embodying the present invention;

Fig. 5 is a perspective view of a cam crank lever forming a part of the attachment;

Figs. 6, 7, 8 and 9 are diagrammatic views showing the parts in the positions they assume as the bolster moves from a selected normal light load car position to a selected loaded position; and Fig. 10 is a small diagram of the complete truck viewed from the side.

But these drawings and the corresponding description are used for the purpose of disclosure only and are not intended to impose unnecessary limitations on the claims.

In the conventional truck selected for this illustration, the side frames are each composed of a top chord 10 and a bottom chord 11, connected at their opposite ends by a journal box

2

12, and connected adjacent to the middle by columns 13, two of which and the intervening portions of the top and bottom chords bound a bolster opening 14, formed large at the bottom to admit the bolster in assembly and narrowed at the top by offsets 15 which embrace the bolster 16 and are often provided with wear plates.

That portion 17 of the bottom chord beneath the bolster opening is provided with flanges 18 (Figs. 1 and 2), which together with the top web 19 of the bottom chord form a spring seat to receive the nest of springs in the conventional practice. Typical nests of springs are shown in the Car Builders' Cyclopedia, 1943, at page 1145, et seq., and their arrangement in the side frame beneath the bolster is shown on pages 1080 and 1081.

According to this invention, the nest of springs is omitted, and the bolster is supported by long-travel, soft springs through levers which act between the bolster and the springs.

In Fig. 4, 20 indicates generally a steel casting in and about which the attachment is assembled and by means of which it is assembled on the corresponding side frame of the truck. In the intermediate portion of this casting, there is what may be called for want of a better term a base or seating wall 21 adapted to be received within the bolster opening 14 and to rest upon the spring seat (Figs. 1 and 2), and its upper surface is provided at approximately the center with a circular boss 22 to receive the lower end of an auxiliary spring 43.

At each side of the base 21, there are column sections 23 from which project curving fulcrum brackets 24 supported by gussets 25.

Beyond the column portions 23 are side members 26, which in this instance turn upwardly and blend into spring cylinder casings 27 at the outside and bottom chord engaging flanges 28 at the inside, which latter telescope over the bottom chord, as shown best in Fig. 3. Actually, in this drawing the side pieces 26 are connected with the spring cylinders by webs 29, but that is an incident of design.

Each fulcrum bearing 24 receives a shaft 30 (Fig. 5) of a cam crank lever having short arms 31 equipped with cammed surfaces or heads 32 to receive and support the bolster 16 and a long arm 33 having a cam head 34 adapted to act upon and cooperate with the springs in the spring cylinders 27.

In this particular embodiment, those springs are shown as double coils 35 and 36 following generally the conventional lines of bolster springs, but, of course, specially designed for the present purpose. They are nested together and inserted within the spring cylinder casings 27 against the fixed heads 37 and follower heads 38, inserted through the open ends 39, work back and forth with the springs in the cylinder, and carry anti-friction rollers 40 in bearings 41, which rollers cooperate with and act directly upon the cam heads 34 of the long arms 33 of the crank levers.

The selected normal light load position of the parts is shown in Figs. 1 and 6 in which the bolster rests on the cam heads 32 and also the upper end of the auxiliary spring 43. As the bolster descends under load or stress, the auxiliary spring 43 yields, the crank levers rotate about the fulcra, the cam heads 32 rock on the under surface of the bolster, and the cam heads 34 work against the antifriction rollers 40 and transmit the stress to the springs 35 and 36 within the spring cylinder casings 27. The length of the lever arms and the curvature of the cams in this particular design are such that when the bolster has moved downwardly 1½" the springs 35 and 36 have been compressed 3". The selected intermediate positions shown in Figs. 7 and 8 illustrate the position of the parts and the relative movement as the bolster is lowered ½" and 1", respectively.

By comparison of Figs. 1, 6, 7, 8, and 9, it will be apparent that the rocking movement of the crank arms serves to decrease the effective length of the short arm 31 as the bolster descends, and vice versa as the bolster ascends. From this, it will be apparent that in light load position the bolster is at a certain mechanical disadvantage with respect to the springs 35 and 36, and that disadvantage changes as the bolster descends and the springs gain a greater and greater advantage by which they are the more able to support load as the bolster descends and the springs are compressed. Thus, the bolster is supported by long-travel, soft springs affording smooth, comfortable riding for light or empty loads and gradually changing to stronger, shorter travel springs as the load is increased and the springs are compressed.

This embodiment is only one illustration of how the principle of this invention may be applied to car trucks. The design was based upon an assumed car body weight of 40,000 pounds. The springs 35 and 36 are 6" double-coil with a deflection rate of 5,000 pounds per inch to stand 14" light car; 9" solid height, solid capacity 25,000 pounds, 8 per car. The cam crank levers and fulcra were designed to each bear 10,000 pounds light car weight and have a rail limit of 38,750 pounds at 1½" travel.

The auxiliary spring is designed to have a deflection rate of 300 pounds per inch as it is only an auxiliary.

In one mode of assembly, the bolster is inserted through the bolster opening 14 and raised toward the upper limit against the top chord; the casting 20 is inserted, and the auxiliary spring 43 put in place. In this relation, the truck can be moved about and the remainder of the parts installed as may be convenient with respect to the equipment on hand. The springs 35 and 36 will be inserted in the spring cylinders 27 followed by the follower heads 38 and compressed a suitable amount, where they will be made fast by any one of a number of familiar expedients, such as inserting a pin or applying a clamp. This operation is followed by inserting the bearing 41 and the cam crank levers, the bolster being raised slightly to facilitate the emplacement of the levers, and then lowered to the position shown in Fig. 1.

In new trucks, the casting 20 can just as well be made a part of the side frame casting, due regard being taken for the technique of the foundry and other incidents of design.

The relation of the spring casing cylinders 27 and therefore the axes of the springs 35 and 36 were arbitrarily chosen in this disclosure to conform to the position of the inclined portions of the bottom chord. That choice was arbitrary. The axes of the springs might just as well have been inclined farther toward the vertical to the end that they would be substantially at right angles to the axis of the long arms 33 of the levers in mid position of bolster travel. This, however, like other features, would be a matter of choice and personal preference. Embodying the invention in the various types of trucks will necessarily call for variations.

I claim:

1. In a truck, a side frame having top and bottom chords and columns providing a bolster opening, a bolster having an end portion in the opening, a lever fulcrumed on the side frame having a short arm and a long arm with the former directly engaged by and at all times supporting the bolster, a long-travel, soft spring carried by the side frame and resisting movement of the long arm of the lever in one direction, and means to vary the relative lengths of the lever arms as the bolster descends in the opening.

2. In a truck, a side frame having top and bottom chords and columns providing a bolster opening substantially midway between the ends of the side frame, a bolster having an end portion mounted in the opening for vertical movement, a spring mounted on the side frame adjacent to an end portion thereof and having an end extending adjacent said bolster opening, and a lever fulcrumed between its ends on the side frame having one arm directly engaged by and supporting at all times the bolster and having its other arm reacting against said end of the spring.

3. In a truck, a side frame having tension and compression members separated between their ends by spaced vertical columns forming a bolster opening, said tension member being inclined inwardly and downwardly toward the bolster opening, a bolster having an end portion mounted in the opening for vertical movement, a coil spring mounted on an inclined portion of the tension member and having its axis parallel thereto, and a lever fulcrumed between its ends on the side frame having one arm directly engaged by and supporting at all times the bolster and having its other arm reacting against the spring.

4. In a truck, a side frame having top and bottom chords and columns providing a bolster opening substantially midway between the ends of the side frame, a bolster having an end portion mounted in the opening for vertical movement, and means attachable to the side frame for resiliently supporting at all times the bolster comprising a spring housing, a spring in said housing, a lever bearing, and a lever fulcrumed between its ends in said bearing and having one arm directly engaged by and supporting the bolster and having its other arm reacting against the spring.

5. In a truck, a side frame having top and bottom chords and columns providing a bolster opening substantially midway between the ends of the side frame, a bolster having an end portion mounted in the opening for vertical movement, a pair of springs mounted on the side frame one adjacent to each end portion thereof, and a pair of levers fulcrumed between their ends on the side frame each having one arm directly engaged by and supporting at all times the bolster and having its other arm reacting against the adjacent spring, said springs being arranged in vertically converging planes.

6. In a truck, a side frame having tension and compression members separated between their ends by spaced vertical columns forming a bolster opening, said tension member having opposite end portions inclined inwardly and downwardly toward the bolster opening, a bolster having an end portion mounted in the opening for vertical movement, a coil spring mounted on each of the inclined portions of the tension member and having its axis parallel thereto, and a pair of levers fulcrumed between their ends on the side frame each having one arm directly engaged by and supporting the bolster at all times and having its other arm reacting against the adjacent spring.

7. Means attachable to the side frame of a truck having top and bottom chords and columns providing an opening substantially midway between the ends of the side frame for mounting a bolster end portion for vertical movement, said means comprising a spring housing, a long-travel, soft spring in said housing, a lever bearing, a lever fulcrumed between its ends in said bearing and having a short arm supporting the bolster and having a longer arm reacting against the spring, and a seating wall insertable into said opening for seating on said bottom chord, and connected to the bearing and housing, and an auxiliary spring disposed on said seating wall to support the end of a bolster.

8. In a truck, a side frame member, a lever fulcrumed intermediate its ends on said member and having a short arm and a long arm, a spring carried by said member reacting against said long arm, a cam surface on said short arm, and a bolster supported by said lever on said surface against the reaction of said spring, said surface being formed and arranged for varying the effective length of said short arm in response to variations of pressure on the bolster.

9. A bolster supported assembly attachable to the side frame of the truck having a bolster opening receiving a bolster end therein, said assembly comprising a housing at each side of said opening on the outboard side of said frame, a portion interconnecting said housings seated on said frame in said opening, resilient means in each housing, a lever bearing at each side of said opening on said portion, and a lever fulcrumed intermediate its ends in each bearing and having an arm supporting said bolster and having another arm reacting directly against the adjacent resilient means.

10. In a truck having spaced top and bottom members and spaced columns defining a bolster opening, a bolster extending into said opening, means for supporting the bolster comprising a frame having a seat portion supported on said bottom member, a bearing on said portion seated against a column, a housing connected to said bearing and portion, spring means within the housing, lever means fulcrumed intermediate the ends thereof on said bearing and having opposite ends engaging said spring means and said bolster, and auxiliary resilient means interposed between the bolster and said seat portion.

11. A bolster-supporting means comprising an element having an intermediate portion insertable into a bolster opening of an associated truck frame, end portions at opposite ends of said intermediate portion inclined to the plane thereof and comprising spring housings, springs within the housings, bearings on said intermediate portion adjacent opposite ends thereof, and levers fulcrumed intermediate their ends on respective bearings and affording bolster-seating surfaces at one of their ends and engaging respective springs at their other ends.

12. Bolster-supporting means comprising a unitary element having an intermediate seating portion insertable into a bolster opening of an associated truck frame, end portions at opposite ends of said intermediate portion connected thereto and offset laterally with respect thereto to fit against a side of the frame, said end portions comprising spring housings at one side thereof and means adapted to embrace a portion of the frame at the opposite side thereof, bearings at opposite ends of said intermediate portion connected thereto and to respective end portions, spring means within the housings, and levers pivoted intermediate their ends on respective bearings and presenting bolster-engaging surfaces at one of their ends and engaging adjacent spring means at their other ends.

13. In a device of the class described, a frame comprising an intermediate seating portion, end portions connected to opposite ends of said intermediate portion and offset laterally with respect thereto, each end portion comprising a spring housing and frame-embracing means, and spaced bearings on said intermediate portion connected thereto and to respective end portions.

14. A frame for a bolster supporting assembly comprising a seating portion intermediate its ends for mounting said element in a bolster opening of an associated truck frame, a spring housing at each end of said portion connected thereto, and lever bearings on said portion adjacent each end thereof.

15. In a device of the type described, an element comprising a substantially horizontal seating wall, upright spaced bearings on said wall connected thereto, a generally vertical wall connected to each bearing and extending away from said first-mentioned wall, a spring housing on one side of each of the second mentioned walls and frame engaging webs on the opposite side of each of said second-mentioned walls.

16. In a truck, a side frame having top and bottom chords and columns providing a bolster opening, a bolster having an end portion in the opening, a lever fulcrumed on the side frame having a short arm and a long arm with the former directly engaged by and at all times supporting the bolster, a long-travel, soft spring carried by the side frame and resisting movement of the long arm of the lever in one direction, and means to vary the relative lengths of the lever arms as the bolster descends in the opening, and an auxiliary resilient means interposed between the bolster and said bottom chord.

CARL R. MOLINE.

REFERENCES CITED

The following references are of record in the file of this patent:

UNITED STATES PATENTS

| Number | Name | Date |
| --- | --- | --- |
| 1,210,493 | Lamont | Jan. 2, 1917 |
| 1,916,145 | Hedgcock | June 27, 1933 |
| 2,296,770 | Cox | Sept. 22, 1942 |
| 2,300,341 | Chambers | Oct. 27, 1942 |
| 2,305,914 | Tucker | Dec. 22, 1942 |
| 2,308,054 | Chambers | Jan. 12, 1943 |